(12) United States Patent
Lander, Jr. et al.

(10) Patent No.: US 6,738,476 B2
(45) Date of Patent: May 18, 2004

(54) METHOD AND SYSTEM FOR ENHANCED COLOR TRANSMISSION IN A PORTABLE COMMUNICATION DEVICE

(75) Inventors: Ronald Jon Lander, Jr., Calabasas, CA (US); Gregor Daniel Magnusson, Thousand Oaks, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 330 days.

(21) Appl. No.: 09/895,724

(22) Filed: Jun. 29, 2001

(65) Prior Publication Data

US 2003/0002661 A1 Jan. 2, 2003

(51) Int. Cl.⁷ ............................................ H04M 1/00
(52) U.S. Cl. ..................... 379/433.04; 379/433.01; 379/433.11
(58) Field of Search ............... 379/433.04, 433.01, 379/433.11; 455/566; 349/65

(56) References Cited

U.S. PATENT DOCUMENTS 6,425,675 B2 * 7/2002 Onishi et al. ................. 349/65

FOREIGN PATENT DOCUMENTS

EP    1109380 A2    6/2001

* cited by examiner

*Primary Examiner*—Jack Chiang
(74) *Attorney, Agent, or Firm*—Jubin Dana; Steven A. Shaw

(57) ABSTRACT

A cover and a method for creating the cover are disclosed. The cover includes a frame and a lens secured to the frame. A first and second surface regions of the lens are proximally located relative to the frame, such that the first surface region is polished to allow light that emerges from the frame to pass through and the second surface region is rough in order to reflect light emerging from the frame. The method of creating a fading color hue in a cover includes the steps of creating a polished region on one surface the lens; creating a reflective region on another surface of the lens to allow for maximum reflection of light; creating a dispersion region on a third surface region of the lens, wherein the third surface is positioned opposite the reflective region; and securing the lens to the frame, such that the polished region and the reflective region are in close proximate to the frame thereby creating a gradually fading hue in the lens.

5 Claims, 2 Drawing Sheets

METHOD AND SYSTEM FOR ENHANCED COLOR TRANSMISSION IN A PORTABLE COMMUNICATION DEVICE

BACKGROUND

This invention relates to portable communication devices, and more specifically to a portable communication device with enhanced color transmission and transfusion characteristics.

In general, portable communication devices have several common components, such as a transmission and receiving units, which may also be referred to as a transceiver unit, that are controlled by circuitry, an input device coupled to the circuitry, a display unit coupled to the circuitry, and a microphone type receiver unit and a sound generation units working in conjunction with the transceiver unit. For example, known forms of generating sound in a portable communications device include the use of a speaker fixed in position, typically above the display unit, with the microphone unit located at an opposite end from the sound generating unit. Each speaker unit requires a minimum volume of air for proper operation.

In addition to the common elements that exist in the portable communication devices, there are various other features that users desire. For example, some users prefer to have a mobile device that is aesthetically appealing. One feature that is commonly utilized is a changeable cover. These covers have various designs, logos, or images painted on the surface. One disadvantage to these painted designs is that the paint can become scratched.

Alternatively, some replaceable covers utilize various colors of plastic. Colored plastic is more durable that paint, but also more limited in the designs that can be created. In addition to colored plastic, transparent or clear plastic can be utilized.

Another approach to creating an aesthetically appealing design is by introducing hues or color change. The currently known methods incorporated application of paint, graphical ink, and/or mechanically bonding polymer. Either one of these techniques can be used alone or in conjunction with other techniques. The problem and disadvantage to using these techniques is that these techniques are secondary processes that require additional time and money to produce. Furthermore, given that these techniques are applied to the after each cover is produced, they are applications which are costly to apply, reduce the manufacturers ability to recycle due is part to the application of material and solvents.

Therefore, what is need is a method and system for producing aesthetically appealing portable communication devices wherein the secondary application are eliminated thereby reducing costs, time delays, and logistical problems while improving recycling features.

SUMMARY

A method and system are disclosed for producing aesthetically appealing portable communication that utilize transmittance of hue, hum, or glow thereby eliminating the need for secondary application resulting in increased saving of time and cost as well as the ability to recycle.

The cover includes a frame and a lens secured to the frame. A first and second surface regions of the lens are proximally located relative to the frame, such that the first surface region is polished to allow light that emerges from the frame to pass through and the second surface region is rough in order to reflect light emerging from the frame. The method of creating a fading color hue in a cover includes the steps of creating a polished region on one surface the lens; creating a reflective region on another surface of the lens to allow for maximum reflection of light; creating a dispersion region on a third surface region of the lens, wherein the third surface is positioned opposite the reflective region; and securing the lens to the frame, such that the polished region and the reflective region are in close proximate to the frame thereby creating a gradually fading hue in the lens.

DETAILED DESCRIPTION

Figure 1:
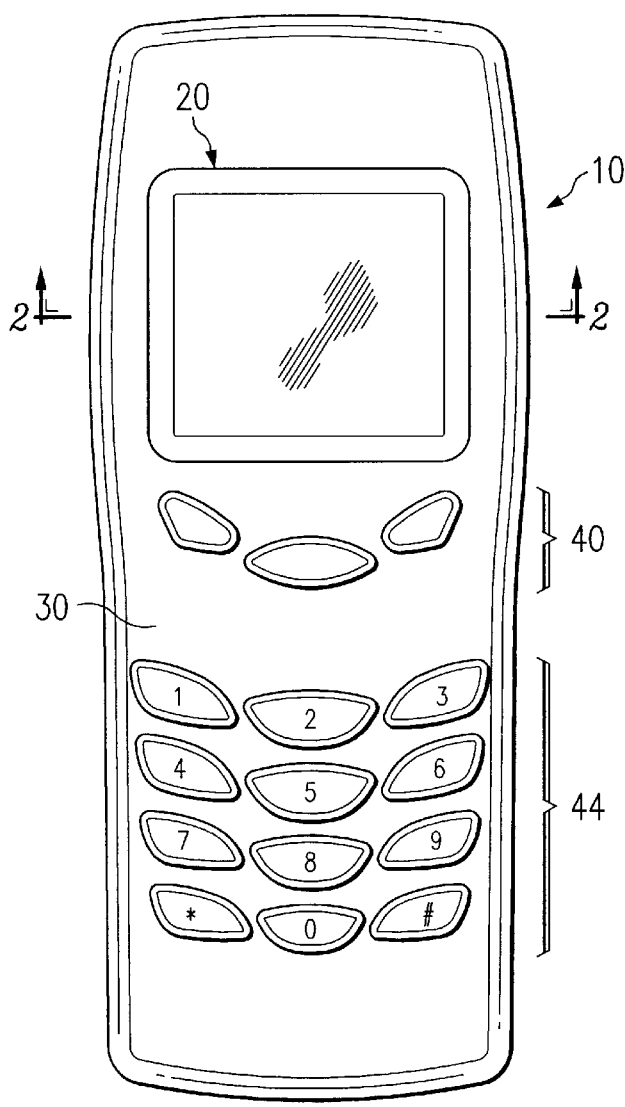
FIG. 1 is a perspective elevation of a cover for a portable communication device.

Referring now to FIG. 1, a cover 10 for a portable communication device includes a window or lens 20 and a frame 30. The lens 20 is in contact with the frame 30, which will be discussed in detail below. The lens 20 is made of transparent resin. However, the lens 20 can be made of a variety of material that have translucent or transparent characteristics and the teaching set forth herein is not limited thereby. The frame 30 includes openings 40 and 44 that define the location of the functions keys of the portable communication device. As discussed below, the frame 30 can be made from colored resign or be capable of emitting light of a desired wavelength in the visible spectrum. Although shown in a unique shape and size with a select number of function key openings, the scope and spirit of the teachings set forth and claimed herein is not limited thereby. Any number of openings as well as any shape and size can be created in accordance with the teachings set forth herein.

Figure 2:
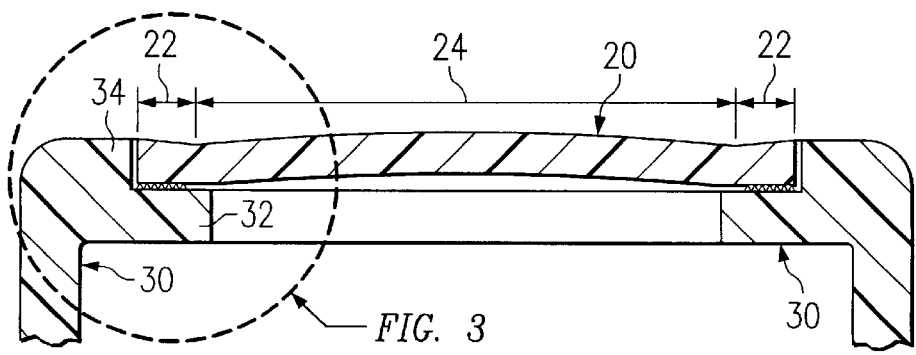
FIG. 2 is a cross-section view of the cover of FIG. 1 along cut-line A—A.

Referring now to FIG. 2, the lens 20 is shown having a side region 22 and a middle region 24. The side region 22 overlaps a lip portion 32 of the frame 30. The frame 30 also includes a side support portion 34. Although discussed with respect to only one side of the frame 30, the teachings set forth herein apply to the entire region of the frame 30 surrounding the lens 20. The lens 20 is secured in position in the frame 30 between the side support portion 34 and the lip portion 32. The side region 22 of the lens 20, when in the secured position, is proximally located near the lip portion 32 and the side support portion 34, such that light can travel from the frame 30 to the lens 20 through the side region 22.

Figure 3:
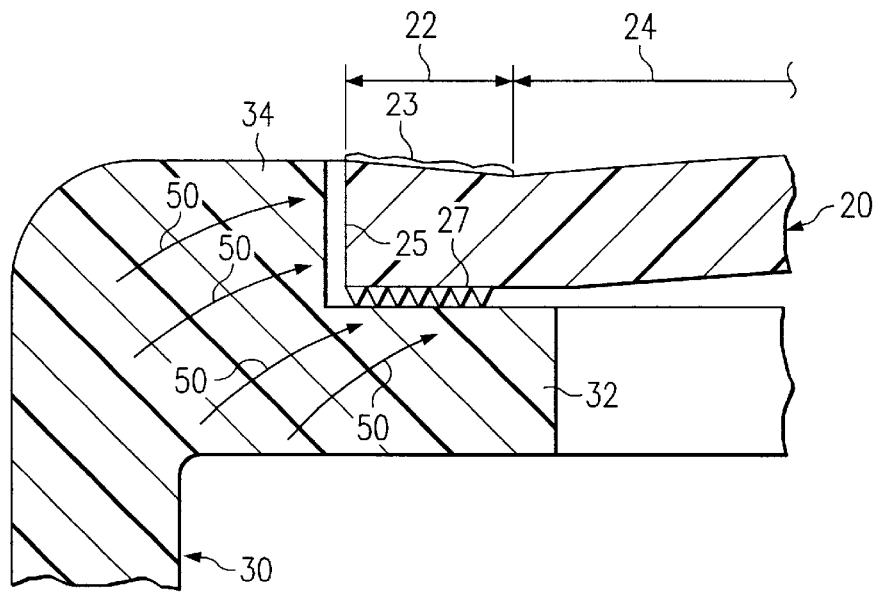
FIG. 3 is an enlarged view of a portion of the cross-section view of FIG. 2 showing greater detail of the interface between a lens portion and a frame portion of the cover.

Referring now to FIG. 3, in one embodiment, the side region 22 includes an upper surface 23, a side surface 25, and a lower surface 27. The upper surface 23 is prepared to have a fog-like texture. The term "fog-like" is used and an uneven surface is shown, the intent is to create a surface such that when the light emerges from the side region 22 through the upper surface 23, then the light is dispersed. The side surface 25 is polished to allow the majority of the light to pass through with minimal alteration. The side surface 25 is shown for illustration purposes, but can be matingly and proximally located near the side support region 34. Regardless of where the side surface 25 of the lens 20 is located relative to the side support region 34 of the frame 30, the light traveling through the frame 30 must emerge from the frame 30 and enter the lens 20.

The lower surface 27 is uneven or "rough" in order to disperse and reflect light away from the lens 20. Although the term rough is used and a jagged shape is shown, the actual texture is relatively smooth to the touch, but rough at the microscopic level relative to the wavelength of the light being reflected.

The frame 30 can include a light-emitting source that produces or emits visible light waves 50 in the direction of the lens 20. The light waves 50 can be of a variety of wavelength and, hence, a variety of colors and the scope of the teaching set forth herein is not limited thereby. The light waves 50 travel through the side support region 34 and the lip portion 32 and emerge form the frame 30. Alternatively, the frame can be made of a desired color and the color of the frame 30 is emitted into the lens 20. Regardless of whether a light source is used or the color of the frame 30 is utilized, the result will be light waves, of a specific wavelength, emerge from the frame 30 through the 32 and 34.

The light waves that come in contact with the rough portion of the lower surface 27 are reflected and generally do not enter the lens 20. The light waves 50 emerge from the frame 30 through the side support portion 34 enter the lens 20 through the side surface 25.

The light waves that enter the lens 20 through the side surface 25 emerge from the upper surface 23 and are dispersed by the fog-like texture of the upper surface 23. Thus, the lens 20 appears to have a hue or color change that gradually fades in the direction away from the side surface 25.

In addition to the textures on the surface of the side region 22, the surface of the middle region in close proximity to the side region 22 can be altered to further alter the characteristics of the light waves emerging from the lens 20. For example, the area at the boundary of the side region 22 and the middle region 24, which is in the middle region 24 area, can be masked to prevent any light from emerging therefrom. Alternatively, the surface of the same area can be altered to further alter the characteristics of the light while allowing some of the light to pass through.

Figure 4:
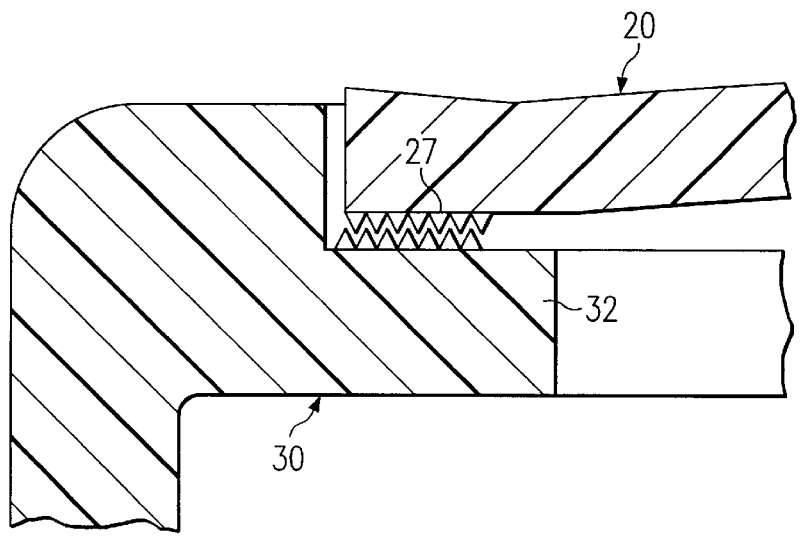
FIG. 4 is an enlarged view of a portion of the cross-section view of FIG. 2 showing greater detail of the interface between a lens portion and a frame portion of the cover.

Referring now to FIG. 4, in another embodiment, the both the 27 and the surface of the 32 can be roughed to enhance the reflection characteristics of the joint between the 27 and the 32.

Figure 5:
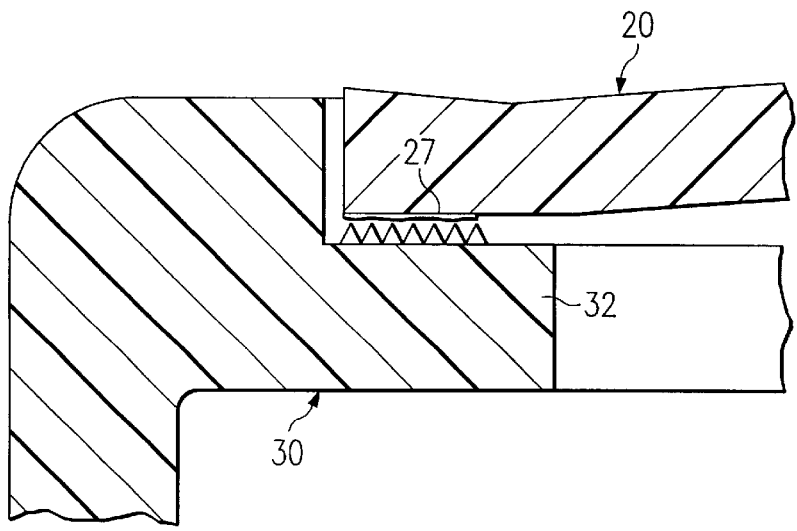
FIG. 5 is an enlarged view of a portion of the cross-section view of FIG. 2 showing greater detail of the interface between a lens portion and a frame portion of the cover.

Referring now to FIG. 5, in yet another embodiment, the 27 is made smoother than the 32, such that the 27 is almost fog-like similar to the 23 of FIG. 3, so that the light that emerges from the 32 that is not reflected will be dispersed as it enters the lens 20 through the 27.

Although described in the context of particular embodiments, it will be apparent to those skilled in the art that a number of modifications to these teachings may occur. For example, a variety of surface texture and composition are contemplated in a variety of surface-to-surface combinations. Furthermore, a variety of materials can be use to create the lens 20 that will effect the light waves in a different manner. Thus, while various embodiments have been particularly shown and described, it will be understood by those skilled in the art that certain modifications or changes, in form and shape, may be made therein without departing from the scope and spirit of the invention as set forth above and claimed hereafter.

What is claimed is:

1. A non-planer cover for a portable communication device, the non-planer cover comprising:
    a frame having a side support portion and lip portion; and
    a lens secured to the frame and coupled to the side support portion and lip portion of the frame, wherein a first and second surface regions of the lens are proximally located relative to the side support portion and lip portion respectively of the frame, such that the first surface region is polished to allow light that emerges from the side support portion of the frame to pass through and the second surface region is rough in order to reflect light emerging from the lip portion of the frame.

2. The cover of claim 1 wherein the light emerging from the frame is emitted light from a light source of a desired wavelength in the visible spectrum that emerges from the frame and enters the lens through the first surface and is reflected by the second surface.

3. The cover of claim 1 wherein the light emerging from the frame emitted from the frame that is made of a desire color that emits light of a desired wavelength in the visible spectrum from the visible spectrum that emerges from the frame and enters the lens through the first surface and is reflected by the second surface.

4. The cover of claim 1, wherein the lens further comprises a third surface region positioned opposite the second surface, wherein the third surface region is altered to disperse light that emerges from the lens.

5. A method of creating a fading color hue in a non-planer cover, which includes a frame having a side support portion and lip portion and a lens, for a portable communication device, the method comprising:
    creating a polished region on one surface region of the lens to allow for maximum transfer of light emerging from the frame;
    creating a reflective region on another surface region of the lens to allow for maximum reflection of light emerging from the frame;
    creating a dispersion region on a third surface region of the lens, wherein the third surface region is positioned opposite the reflective region; and
    securing the lens to the frame, such that the polished region and the reflective region are in close proximate to the frame to allow light to emerge from the frame and enter the lens thereby creating a gradually fading hue in the lens in the third surface region.

* * * * *